United States Patent [19]

Matsumoto et al.

[11] Patent Number: 5,468,039
[45] Date of Patent: Nov. 21, 1995

[54] INSTRUMENT PANEL FOR AUTOMOBILE

[75] Inventors: Masahito Matsumoto; Nobuhiro Usui, both of Osaka, Japan

[73] Assignee: Sumitomo Chemical Company, Limited, Osaka, Japan

[21] Appl. No.: 211,966

[22] PCT Filed: Aug. 20, 1993

[86] PCT No.: PCT/JP93/01169

§ 371 Date: Apr. 21, 1994

§ 102(e) Date: Apr. 21, 1994

[87] PCT Pub. No.: WO94/04386

PCT Pub. Date: Mar. 3, 1994

[30] Foreign Application Priority Data

Aug. 21, 1992 [JP] Japan .................................. 4-222592

[51] Int. Cl.⁶ .............................. B60K 37/00; B60H 1/00
[52] U.S. Cl. .............................. 296/70; 180/90; 454/127
[58] Field of Search ......................... 296/194, 70; 180/90; 454/127

[56] References Cited

U.S. PATENT DOCUMENTS 4,223,754  9/1980  Mizuno .

FOREIGN PATENT DOCUMENTS

| 0175121 | 3/1986 | European Pat. Off. . |
| 201726 | 12/1982 | Japan .................................. 296/70 |
| 61-241126 | 10/1986 | Japan . |
| 63-165107 | 7/1988 | Japan . |
| 1431441 | 4/1976 | United Kingdom .................................. 296/70 |
| 2059330 | 4/1981 | United Kingdom . |

*Primary Examiner*—Joseph D. Pape
*Attorney, Agent, or Firm*—Cushman Darby & Cushman

[57] ABSTRACT

An instrument panel for automobiles in which a skin material is laminated to the surface of a thermoplastic resin core material and which is obtained by feeding the skin material to between a pair of male and female molds and press-molding a molten thermoplastic resin after or while feeding the molten thermoplastic resin to between the skin material and the male mold or the female mold, wherein the instrument panel has on its surface at least one exposure portion of the thermoplastic resin core material, the skin material end in the boundary portion between the exposed core material portion and the skin material end around the exposure portion is embedded into and fixed in the exposed core material resin, and at least one perforation perforated through the core material layer is formed in the core material exposure portion. In the thus obtained panel, the core material resin and the skin material are strongly and integrally bonded to each other; separate parts for forming the opening portion are not required; and the finishing of the skin material end around the opening portion is beautiful and the appearance thereof is also beautiful.

4 Claims, 4 Drawing Sheets

INSTRUMENT PANEL FOR AUTOMOBILE

TECHNICAL FIELD

This invention relates to an instrument panel for an automobile in which a skin material is laminated to the surface of a thermoplastic resin core material.

BACKGROUND TECHNIQUE

As the instrument panel for an automobile, there have heretofore been used those in which a skin material is laminated with an adhesive to a thermoplastic resin core material previously formed into the desired shape by injection molding or the like.

Usually, such instrument panels for automobiles are required to have an opening portion such as an air blowoff hole for air-conditioning or preventing window glass from being clouded, or the like, and as an instrument panel having such an opening portion, there have been known those in which an opening portion consisting of a single opening having the desired size is provided by mechanically boring or the like in an instrument panel in which a skin material is laminated to the whole surface of a resin core material and which has been obtained by a method as mentioned above and those obtained, when an opening portion consisting of a plurality of small holes is required, by fitting an opening part having at least 2 plural small holes formed separately by injection molding or the like to the said opening portion and fixing the part in the opening portion.

However, in the heretofore known instrument panels, there have been such problems that the bonding strength between the thermoplastic resin core material and the skin material is insufficient, that since an opening portion is provided by boring mechanically or the like a panel as obtained by laminating the skin material to the resin core material, the end of the skin material layer rises onto the panel surface at the bored panel face around the opening portion to mar the beauty remarkably and that when the opening portion is composed of small holes the separately formed opening part is fitted to and fixed in the opening portion and hence the fitting strength of the opening part to the opening portion is insufficient, whereby the opening part comes up or disconnected from the opening portion owing to vibration during the running.

DISCLOSURE OF THE INVENTION

The present inventors have made extensive research for removing such faults possessed by conventional instrument panels for automobiles and developing instrument panels for automobiles in which the skin material is strongly bonded to the resin core material; the appearance of the opening portion is beautiful; and even the opening portion has plural openings no opening part is required to be fitted to the opening portion, and have, as a result, reached this invention.

That is to say, this invention provides an instrument panel for automobile in which a skin material is laminated to the surface of a thermoplastic resin core material and which is obtained by feeding a skin material to between a pair of male and female molds so designed that the desired instrument panel shape is obtained and then press-molding a molten thermoplastic resin after or while feeding the molten thermoplastic resin to between the skin material and the male mold or the female mold, characterized in that the instrument panel has on its surface at least one exposure portion of the thermoplastic resin core material; the skin material end at the boundary portion between the exposed core material portion and the skin material end around the exposure portion is embedded into and fixed in the exposed core material resin; and at least one perforation perforated through the core material layer is formed in the core material exposure portion.

Figure 1:
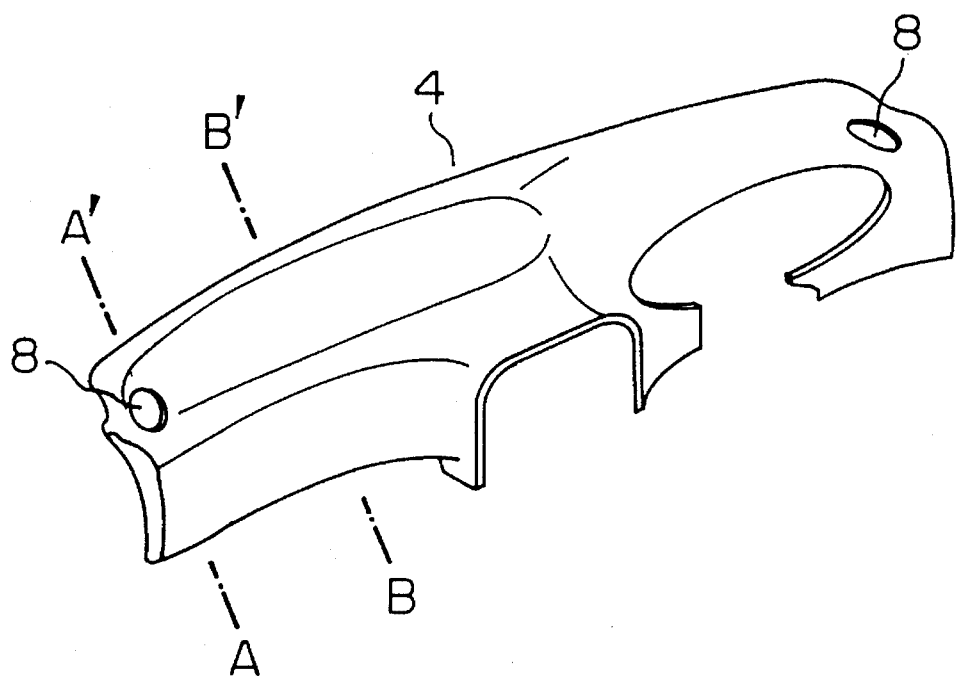
FIG. 1 is a perspective view of the instrument panel of this invention.

Incidentally, the symbols in the figures have the following meanings:

1 Female mold,
2 Male mold,
3 Molten resin-feeding opening,
4 Instrument panel,
5 Molten thermoplastic resin,
6 Skin material,
7 Thermoplastic resin core material,
8 Thermoplastic resin core material exposure portion,
9 Groove,
10 Perforation,
11 Adhesive layer,
12 Separate part in the opening portion,
13 Female mold groove,
14 Protrusion
15 Projecting portion
16 Projecting portion-receiving hole
17 Vacuum suction path

BEST MODE FOR PRACTICING THE INVENTION

In this invention, the thermoplastic resin used as the core material which is the substrate in the instrument panel for automobiles is not particularly limited, and there can be mentioned, for example, polyolefin resins such as polypropylene, polyethylene and the like; styrene resins such as polystyrene, acrylonitrile-styrene-butadiene copolymer, acrylonitrile-styrene copolymer and the like; polyamide resins such as nylon and the like; etc.

Such thermoplastic resins may be used alone or in a mixture of two or more. Moreover, if necessary, fillers such as inorganic fillers, glass fibers and the like and various additives such as pigments, lubricants, antistatic agents and the like may be compounded therewith.

As the skin material, there are mentioned woven fabrics, knitted fabrics, non-woven fabrics and the like; and sheets or films composed of a thermoplastic resin or a thermoplastic elastomer, and those having a concavo-convex pattern such as emboss or the like can also be used. Also, foams made of a thermoplastic resin such as polyolefin type, polyvinyl chloride type, polystyrene type or the like; foams made of a thermosetting resin such as polyurethane type or the like; or foams made of a rubber such as cis-1,4-polybutadiene, ethylene-propylene copolymer or the like can be used. These skin materials may be used alone or in the form of a laminate in which two or more skin materials are laminated through an adhesive or by heat welding. In the use of these skin materials, it is preferable to partially or wholly preform them into an instrument panel shape.

The instrument panel for automobiles of this invention is characterized in that it has at least one exposure portion of the thermoplastic resin core material on its surface, the skin material end at the boundary portion between the exposed core material portion and the skin material end around the exposure portion is embedded into and fixed in the exposed core material resin, and further, at least one perforation perforated through the core material layer is formed in the core material exposure portion.

Here, the exposure portion of the thermoplastic resin core material is a portion in the skin material-laminated instrument panel in which no skin material is present in the portion which has a size corresponding to an opening portion such as an air blowoff opening from the back side to the front side of the panel and which exists in the position corresponding to the opening portion, and the core material resin layer is partially exposed at the surface.

The number of the exposure portions is not limited to one, and opening portions, to the number necessary for the instrument panel, are provided. The whole shape of the exposure portion may be selected from various shapes such as circle, ellipse, tetragon and the like depending upon the designing matters.

Also, the perforation perforated through the core material layer provided in the exposure portion is a perforation through which blowoff air or the like sent from an air conditioning unit provided on the back side of the instrument panel is taken into a car through the front side of the instrument panel, and one perforation may exist or two or more perforations may exist in the exposure portion, and at least two small holes are provided in many cases.

The shape of this perforation may be any shape such as circle, square, rectangle or the like as the front sectional shape and is not particularly limited; however, it is rectangle in many cases for practical purposes.

In the instrument panel for automobiles of this invention, it is very important that at the boundary between the exposed core material portion and the skin material end around the core material exposure portion, the skin material end is embedded into and fixed in the exposed core material resin.

In order for the skin material end to be embedded into and fixed in the exposed core material resin, there is mentioned a method in which the core material resin layer is raised on the skin material side so that the core material resin contacts the skin material end around the core material exposure portion, for example, in the course of molding, a method in which the skin material end is pressed into the core material resin side or a method in which the two are conducted simultaneously. For this purpose, for example, in the cavity position corresponding to the skin material end of the mold on the side contacting the skin material, continuous protrusions for stuffing the skin material end are provided, or in the cavity position corresponding to the skin material end of the mold on the core material resin side, continuous protrusions for pushing up the core material exposure portion are provided, or the two are provided.

FIG. 1 shows an example of the whole shape of the instrument panel for automobile of this invention.

In FIG. 1, 4 refers to an instrument panel for automobile, 8 to the exposure portion of a thermoplastic resin core material. In this example, on each of the left and right sides of the instrument panel, one exposure portion, two exposure portions in total, of a thermoplastic resin core material is provided.

FIG. 2 shows partially the A–A' section crossing the exposure portion and the B–B' section having no exposure portion in FIG. 1.

Figure 2A:
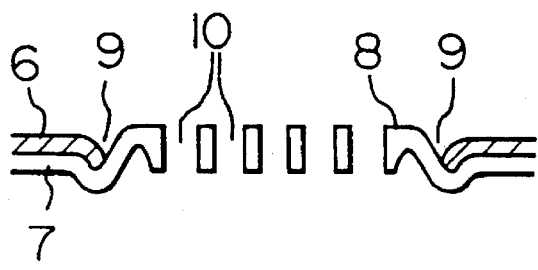
FIG. 2(A) and FIG. 2(B) are partial sectional views of the instrument panel shown in FIG. 1, (A) shows the core material exposure portion at the A–A' section FIG. 1, and (B) shows the exposure portion in the B–B' section FIG. 1.

FIG. 2(A) shows a section of the opening portion 8 of the instrument panel in which a skin material 6 is laminated to a thermoplastic resin core material 7 in which opening portion the core material 7 is exposed without having a skin material, said exposure portion having a plurality of perforations 10. Also, in the same figure, the skin material end is stuffed in the core material resin so that the end of the skin material 6 does not come to the surface at the boundary with the exposed core material 7, and simultaneously, the core material 7 is lifted up so as to contact the skin material, whereby the skin material end is embedded into and fixed in the exposed core material resin. As a result, a groove 9 is formed in the boundary portion between the skin material end and the core material exposure portion.

Figure 3A:
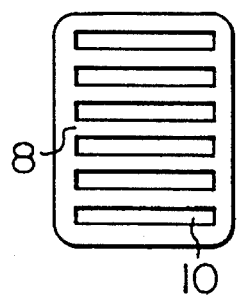
FIG. 3(A), FIG. 3(B) and FIG. 3(C) show examples of the shape of the exposure portion and the shape of perforation in this invention.
Figure 3B:
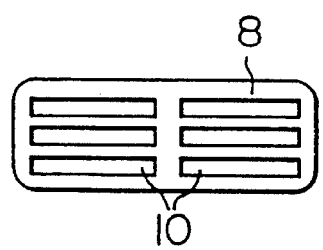
Figure 3C:
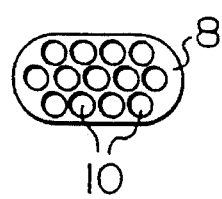

Incidentally, the shape of the perforation in this case may be any shape such as circle, square, rectangle or the like as a front sectional shape as shown in FIG. 3(A), FIG. 3(B) and FIG. 3(C) though not shown in FIG. 2(A), and is not specified at all; however, it is a rectangle in many cases for practical purposes.

Figure 2B:
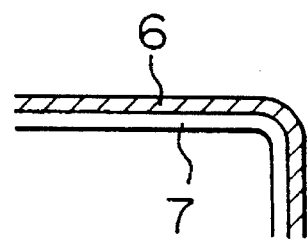

FIG. 2(B) shows a section of the portion having no opening portion, in which the skin material 6 is laminated to the whole surface of the thermoplastic resin core material 7.

Figure 4:
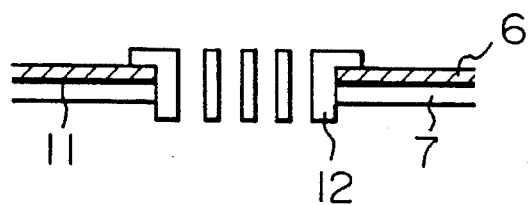
FIG. 4 shows the opening portion in a conventional instrument panel.

In FIG. 4, for comparison, there is shown a sectional view of an opening portion in a heretofore known instrument panel.

As shown in the same figure, in the case of a conventional article, an opening portion is bored in the instrument panel in which a skin material 6 is laminated to a thermoplastic resin core material 7 through an adhesive layer 11, and in this opening portion, an opening part 12 which is a separate part produced separately by an injection molding or the like is inserted thereinto and attached thereto through a means such as adhesive or the like.

The instrument panel for automobiles of this invention is produced by feeding a skin material between a pair of male and female :molds so designed that the desired instrument panel shape is obtained and then press-molding a molten thermoplastic resin after or while feeding the molten thermoplastic resin to between the skin material and the :female mold or the male mold.

A specific process for producing the instrument panel for automobiles of this invention is explained below based on FIGS. 5 and 6.

Figure 5A:
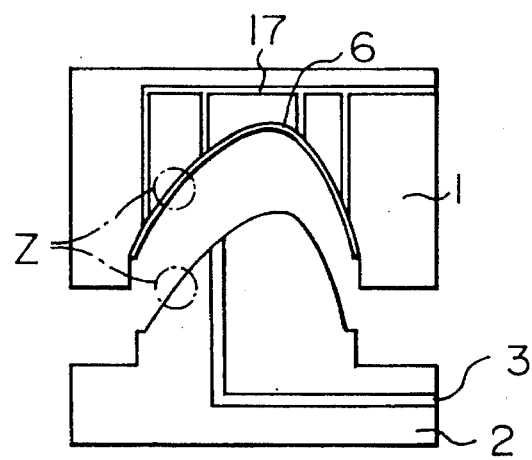
FIG. 5(A), FIG. 5(B) and FIG. 5(C) show an outline of the process for producing the instrument panel of this invention.
Figure 5B:
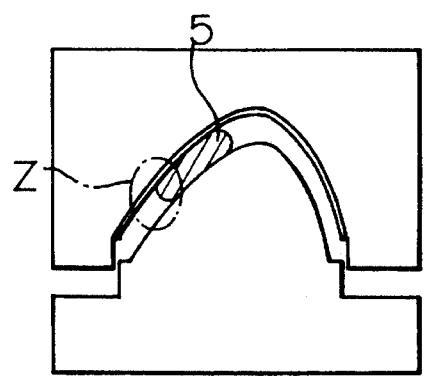

In the state that a pair of female and male molds 1 and 2 so designed that the desired instrument panel shape is obtained is open, a skin material 6 so preformed that the desired instrument panel shape is obtained and a portion corresponding to the core material exposure portion is cut, is kept along the mold surface of the female mold 1 by suction from the vacuum suction path 17 or the like [FIG. 5(A)], the female mold 1 is lowered to an appropriate position, and thereafter, a molten thermoplastic resin 5 is fed from a resin-feeding opening 3 provided in the male mold 2 to between the skin material 6 and the male mold [FIG. 5(B)]. After the predetermined amount of the resin has been fed, the female mold 1 is further lowered and clamping is effected, or while the molten resin is fed the female mold 1 is lowered to conduct the clamping in parallel to the feeding of the resin, thereby press-spreading the molten thermoplastic resin in the mold to form the resin into a shape and simultaneously laminate the skin material 6 to the surface of the thermoplastic resin [FIG. 5(C)]. Moreover, the mold is cooled and thereafter opened, and a molded article is taken out.

There is explained below a method by which the instrument panel is allowed to have at least one exposure portion of the thermoplastic resin core material, the skin material end in the boundary portion between the exposed core material portion and the skin material end around the core material exposure portion is embedded into and fixed in the exposed core material resin and simultaneously perforations perforated through the core material layer are formed in the exposure portion.

Figure 5C:
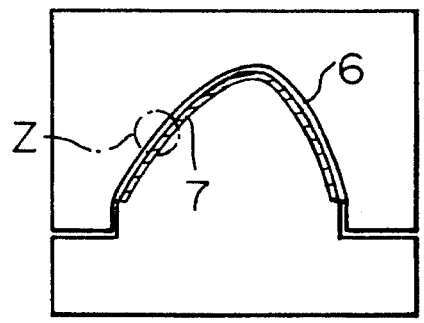
Figure 6A:
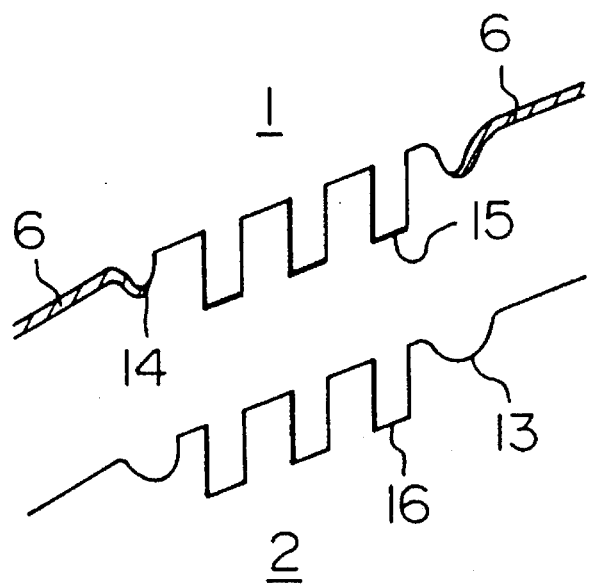
FIG. 6(A), FIG. 6(B) and FIG. 6(C) are partial enlarged views of the Z portion of the diagrammatic view of the production process shown in FIG. 5.
Figure 6B:
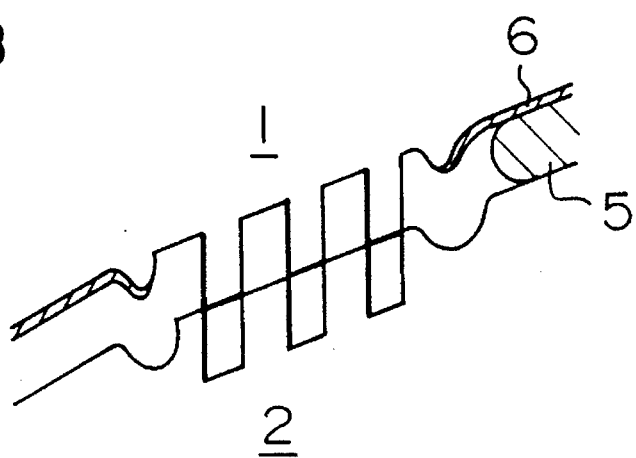
Figure 6C:
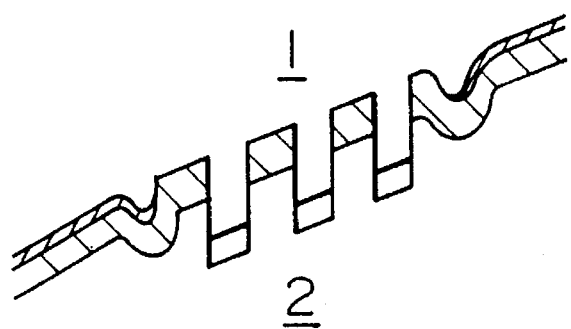

FIG. 6 is an enlarged view of the mold surface portion of the Z portion in FIG. 5, and FIG. 6(A), FIG. 6(B) and FIG. 6(C) correspond, respectively, to the steps of FIGS. 5(A)–(C).

FIG. 6(A) shows the state that a skin material 6 from which the portion in which the core material is to been exposed has previously be cut is kept along the mold surface of the female mole 1 by vacuum suction from the vacuum suction path 17 or the like. On the surface of the female mold 1 are provided continuous protrusions 14 for pressing the skin material end along the boundary portion between the exposure portion and the unexposure portion of the thermoplastic resin core material, and further, in the core material exposure portion enclosed with the protrusions 14, there are formed the necessary number (3 in the figure) of projection portions 15 having a section corresponding to the shape of perforation 10 for forming perforations 10. On the mold surface of the male mold 2 corresponding thereto, grooves 13 for receiving the protrusions 14 and holes 16 for receiving the projection portions 15 are provided. Incidentally, the grooves 13 may be or may not be provided; however, when the grooves are not provided the core material layer becomes thin as much as the skin material end is pressed into the core material resin by means of the protrusions 14, and the strength is lowered. Therefore, in order to keep the strength, it is preferable to provide the grooves to maintain the thickness of the core material resin.

The side walls of the projection portion 15 and the hole 16 form a shear structure to each other.

In the state that the molten resin fed is spread by clamping and flows and moves in the mold, the projection portion 15 is inserted into the hole 16 before the spread molten thermoplastic resin 5 reaches the hole 16, and clamping is effected so that the molten resin does not enter the hole 16 [FIG. 6(C)].

After completion of the clamping, the molds are cooled and then opened to take out the product.

By this procedure, there can be obtained an instrument panel for automobile in which the skin material 6 is strongly and integrally laminated to the surface of the thermoplastic resin core material 7, simultaneously with which its surface is allowed to have at least one exposure portion of the thermoplastic resin core material; the skin material end is embedded into and fixed in the exposed core material resin in the boundary portion between the exposed core material and the skin material end around the core material exposure portion so that the skin material end does not come to the surface; and in addition, the perforations 10 perforated through the core material layer are formed in the exposure portion.

Incidentally, the above-mentioned apparatus and the production process using the same are one working mode, and it is needless to say that the process for producing the instrument panel of this invention is not limited thereto.

WORKING EXAMPLES

This invention is explained below in more detail by Examples; however, this invention is not limited thereby.

Example 1

Based on the process shown in FIGS. 5(A)–(C) and FIGS. 6(A)–(C), an example in which molding was effected with molds for molding an instrument panel having a total length of 1,400 mm is explained below.

As a sink material, an embossed polypropylene elastomer sheet having a thickness of 0.8 mm, to the back of which a 3.0-mm thick, foamed polypropylene sheet having a foaming ratio of 15 (PPSM 15030 manufactured by TORAY INDUSTRIES, INC.) was laminated by heat welding, was used. First of all, the skin material was preformed in a separate step and the portion corresponding to the exposure portion of the thermoplastic resin core material was cut therefrom, after which the skin material was kept along the female mold 1 in FIG. 5. At this time, the maintenance of the skin material was effected by the vacuum suction provided in the female mold 1.

As a thermoplastic resin, polypropylene (Sumitomo Noblen BP697K manufactured by Sumitomo Chemical Co., Ltd.; melt flow index: 30 g/min) was used, and this resin was melted at 230° C. and fed into a mold cavity through a resin-feeding opening 3 provided in the male mold 2, after which clamping was conducted. At this time, the temperatures of the female mold and the male mold were 30° C. and 40° C. respectively Incidentally, the feeding of the molten resin was started when the cavity clearance in the direction of the clamping of the male and female molds was 60 mm, and completed when the cavity clearance was 30 mm. After completion of the feeding of the molten resin, the clamping was conducted until the desired thickness was reached.

The speed of the clamping of the female mold was set at a constant speed of 7 mm/sec between the starting of the feeding of the molten resin and the completion of the feeding. Also, the force required for the clamping was 180 tons. For 35 seconds after the completion of the clamping, cooling under pressure was conducted and then a molded article was taken out of the mold.

In the instrument panel molded article having a thickness of 5 mm obtained, which had 3 perforations having a slender rectangle shape in the rectangular exposure portion of the core material, the core material resin and the skin material were strongly laminated to each other. Also, the skin material end in the boundary portion between the exposed core material portion and the skin material end around the exposure portion was embedded into the exposed core material resin and the appearance was beautiful.

Example 2

Molding was conducted under the same conditions as in Example 1, except that as the skin material, an embossed PVC sheeting having a thickness of 0.8 mm, to the back of which a 3-mm thick foamed polypropylene sheet having a foaming ratio of 15 (PPSM15030 manufactured by TORAY INDUSTRIES, INC.) was laminated through an adhesive, was used.

The instrument panel molded article having a thickness of 5 mm obtained had 3 perforations having a slender rectangle shape in the rectangular exposure portion of the core material resin, and the core material resin and the skin material were strongly laminated to each other. Also, the skin material end in the boundary portion between the exposed core material portion and the skin material end around the exposure portion was embedded in the exposed core material resin, and the appearance was beautiful.

UTILIZABILITY IN INDUSTRY

The instrument panel for automobiles of this invention shows such effects that it does not require providing by boring or the like an opening portion consisting of a single opening having the desired size as conventionally in the instrument panel nor inserting into the opening portion and fixing therein an opening part having at least two plural small holes formed separately by injection molding or the like because the skin material is strongly laminated integrally to the surface of the thermoplastic resin core material and the instrument panel has on its surface at least one exposure portion of the thermoplastic resin core material, and at least two perforations perforated through the core material layer are formed in the exposure portion; and even in the use state after it has been built in an automobile, the peeling of the skin material or the disconnection of the opening portion is not caused and the cost is low.

We claim:

1. An instrument panel for an automobile in which a skin material is integrally laminated to a surface of a thermoplastic resin core material and which is obtained by feeding the skin material between a pair of male and female molds so designed that a desired instrument panel shape is obtained and subsequently press-molding a molten thermoplastic resin after or while feeding the molten thermoplastic resin between the skin material and the male mold or the female mold, characterized in that the instrument panel has on its surface at least one exposed portion with at least one perforation formed through the exposed portion, wherein an end of the integrally laminated skin material at a boundary with the exposed portion is embedded into the exposed portion and fixed therein.

2. An instrument panel for an automobile according to claim 1, wherein the perforation is an air blowoff opening through which air can be introduced.

3. An instrument panel for an automobile according to claim 1, wherein the number of the perforations is 2 or more.

4. An instrument panel for an automobile comprising:

a skin material integrally laminated to a surface of a core comprised of thermoplastic resin, wherein the integrally laminated skin material is obtained by providing a pair of male and female molds having opposing mold surfaces which are matably configured to define therebetween the shape of said instrument panel, and feeding the skin material to a position between said molds, whereupon molding the skin material obtains the shape of said instrument panel, press-molding the shaped skin material to a molten thermoplastic resin after or during feeding of the molten thermoplastic resin between a surface of the skin material and the male mold or the female mold, whereupon press-molding a surface of the shaped skin material is integrally laminated to the thermoplastic resin to form a laminate having a skin layer and a core formed from the thermoplastic resin, wherein said core has at least one exposed portion with at least one perforation formed through the exposed portion, wherein an end of the integrally laminated skin material at a boundary with the exposed portion is embedded into the exposed portion and fixed therein.

* * * * *